(12) United States Patent
Caserta

(10) Patent No.: US 10,805,260 B2
(45) Date of Patent: *Oct. 13, 2020

(54) METHOD FOR TRANSMITTING AT LEAST ONE IP DATA PACKET, RELATED SYSTEM AND COMPUTER PROGRAM PRODUCT

(71) Applicant: STMicroelectronics S.r.l., Agrate Brianza (IT)

(72) Inventor: Francesco Caserta, Naples (IT)

(73) Assignee: STMICROELECTRONICS S.R.L., Agrate Brianza, MB (IT)

(*) Notice: Subject to any disclaimer, the term of this patent is extended or adjusted under 35 U.S.C. 154(b) by 1 day.

This patent is subject to a terminal disclaimer.

(21) Appl. No.: 16/557,507

(22) Filed: Aug. 30, 2019

(65) Prior Publication Data

US 2019/0386953 A1 Dec. 19, 2019

Related U.S. Application Data

(63) Continuation of application No. 16/102,271, filed on Aug. 13, 2018, now Pat. No. 10,505,892.

(30) Foreign Application Priority Data

Aug. 14, 2017 (IT) .................. 102017000093693

(51) Int. Cl.
*H04L 29/12* (2006.01)
*H04L 29/06* (2006.01)
*H04L 12/58* (2006.01)

(52) U.S. Cl.
CPC ........ *H04L 61/2015* (2013.01); *H04L 51/066* (2013.01); *H04L 61/2503* (2013.01); *H04L 61/256* (2013.01); *H04L 61/2514* (2013.01); *H04L 69/163* (2013.01); *H04L 69/164* (2013.01); *H04L 51/38* (2013.01)

(58) Field of Classification Search
CPC . H04L 61/2015; H04L 61/256; H04L 51/066; H04L 51/38; H04L 69/163; H04L 69/164; H04L 61/2503; H04L 61/2514
USPC ....................................................... 455/466
See application file for complete search history.

(56) References Cited

U.S. PATENT DOCUMENTS

| 7,035,383 B2 | 4/2006 | O'Neal |
| 7,885,208 B2 | 2/2011 | Mutikainen et al. |
| 8,279,802 B1 | 10/2012 | Singh |

(Continued)

FOREIGN PATENT DOCUMENTS

| CN | 1885833 A | 12/2006 |
| CN | 101064647 A | 10/2007 |

(Continued)

*Primary Examiner* — Mong-Thuy T Tran

(74) *Attorney, Agent, or Firm* — Slater Matsil, LLP

(57) ABSTRACT

A method for transmitting an Internet Protocol (IP) data packet from a first device to a second device, includes: transmitting a message from the first device to a telephone number associated with the second device; receiving the message at the second device and, in response to the message, determining a first IP address of the first device and transmitting a first IP packet from the second device to the first IP address; receiving the first IP packet at the first device and determining a source IP address of the first IP packet; and transmitting a second IP packet from the first device to the source IP address of the first IP packet.

20 Claims, 5 Drawing Sheets

(56) References Cited

U.S. PATENT DOCUMENTS

| | | | |
|---|---|---|---|
| 10,397,300 B2 | 8/2019 | Lim et al. | |
| 2002/0095589 A1* | 7/2002 | Keech | G06F 21/6209 |
| | | | 713/189 |
| 2006/0059337 A1 | 3/2006 | Poyhonen et al. | |
| 2007/0160034 A1* | 7/2007 | Koretsky | H04L 65/103 |
| | | | 370/352 |
| 2008/0085728 A1 | 4/2008 | Reding et al. | |
| 2008/0096590 A1 | 4/2008 | Celik et al. | |
| 2008/0182621 A1 | 7/2008 | Morman | |
| 2009/0086722 A1* | 4/2009 | Kaji | H04L 29/12386 |
| | | | 370/352 |
| 2009/0168758 A1 | 7/2009 | Apelqvist et al. | |
| 2009/0262668 A1 | 10/2009 | Hemar et al. | |
| 2009/0323632 A1 | 12/2009 | Nix | |
| 2010/0077023 A1 | 3/2010 | Eriksson | |
| 2010/0150328 A1 | 6/2010 | Perreault et al. | |
| 2010/0312897 A1 | 12/2010 | Allen et al. | |
| 2011/0019654 A1 | 1/2011 | Harmatos et al. | |
| 2011/0130121 A1 | 6/2011 | Patel et al. | |
| 2017/0272316 A1* | 9/2017 | Johnson | H04L 61/301 |
| 2017/0346783 A1 | 11/2017 | Follero et al. | |

FOREIGN PATENT DOCUMENTS

| | | |
|---|---|---|
| GB | 2406999 A | 4/2005 |
| WO | 9912365 A1 | 3/1999 |
| WO | 2006088947 A2 | 8/2006 |
| WO | 2011139952 A1 | 11/2011 |
| WO | 2015066372 A1 | 5/2015 |
| WO | 2016097895 A1 | 6/2016 |

* cited by examiner

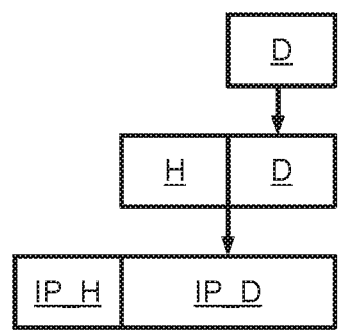
Fig. 3
| NAT Table | | | |
|---|---|---|---|
| LAN_IP | LAN_SP | R_IP | R_SP |
| 192.168.0.50 | 54847 | 12.34.56.78 | 10012 |
| 192.168.0.52 | 24123 | 12.34.56.78 | 18921 |
| 192.168.0.50 | 42156 | 12.34.56.78 | 13123 |
| 192.168.0.51 | 33543 | 12.34.56.78 | 17002 |
Fig. 4
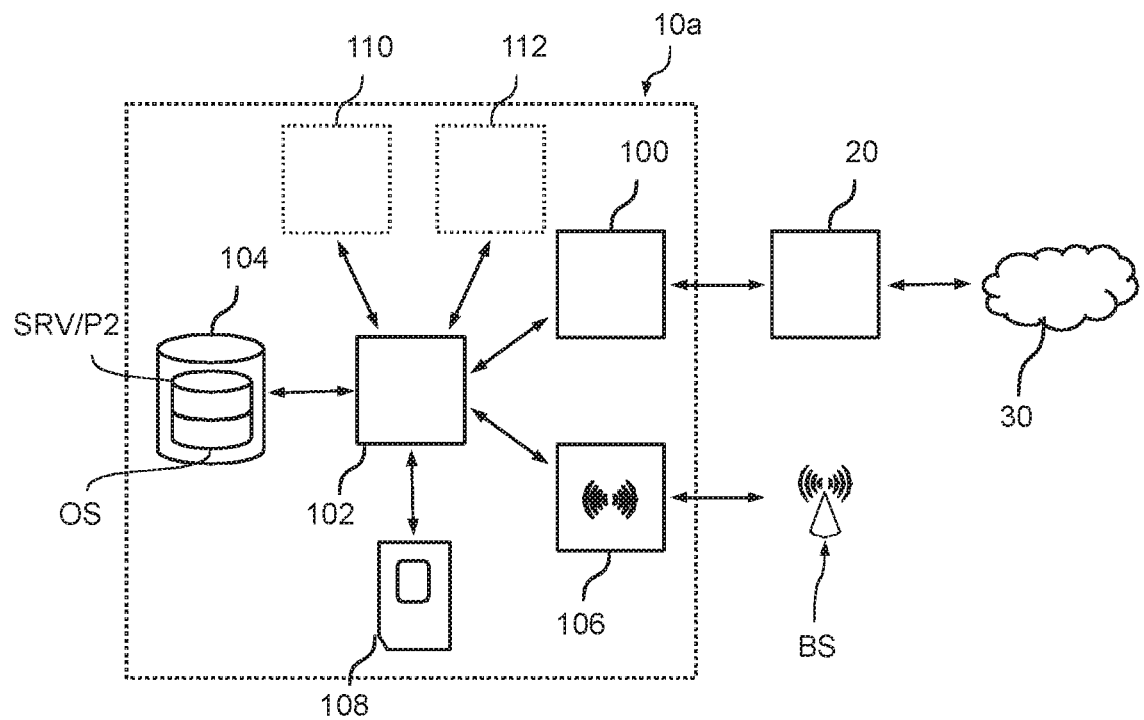
Fig. 5

METHOD FOR TRANSMITTING AT LEAST ONE IP DATA PACKET, RELATED SYSTEM AND COMPUTER PROGRAM PRODUCT

CROSS-REFERENCE TO RELATED APPLICATIONS

This application is a continuation of U.S. patent application Ser. No. 16/102,271, filed on Aug. 13, 2018, which claims priority to Italian Patent Application No. 102017000093693, filed on Aug. 14, 2017. Both applications are hereby incorporated herein by reference.

TECHNICAL FIELD

Embodiments of the present disclosure relate to techniques for transmitting at least one Internet Protocol (IP) data packet from a first device to a second device.

BACKGROUND

FIG. 1 shows a typical communication system.

In the example considered, the system includes a router 20 that enables access to a WAN (Wide-Area Network) 30, such as the Internet.

For instance, the router 20 typically includes for this purpose a communication interface 206 for connection to the network 30. The communication interface 206 may be, for example: a DSL (Digital Subscriber Line) modem; a mobile communication interface, such as a GSM (Global System for Mobile Communications) transceiver, a CDMA (Code Division Multiple Access) transceiver, a W-CDMA (Wideband Code Division Multiple Access) transceiver, a UMTS (Universal Mobile Telecommunications System) transceiver, an HSPA (High-Speed Packet Access) transceiver, and/or an LTE (Long-Term Evolution) transceiver; an Ethernet interface; an optical-fiber interface; and/or a WiFi (Wireless Fidelity) communication interface, for example according to one of the versions of the IEEE 802.11 standard.

Typically, the router 20 moreover includes one or more further communication interfaces 202 for connection to a LAN (Local Area Network). For example, in FIG. 1 two interfaces 202 are shown, such as: an Ethernet interface 202a, which enables connection of a first computer 10a, for example a fixed PC, to the router 20 through a wired network, typically made with RJ45 cables and possible hubs and/or switches; and a Wi-Fi interface 202b, preferably configured as access point, which enables exchange of data with a second computer 10b, such as a portable PC or a mobile device, through a wireless network.

Finally, the router 20 typically includes a processing unit 204 configured to manage exchange of data between the interfaces 202 and 206. For example, the processing unit 204 may be implemented with a microprocessor programmed via software code. One or more of the functions of the processing unit 204 may also be implemented with one or more dedicated hardware components. In this case, the hardware components are preferably programmable, for example through the microprocessor of the processing unit 204. Hence, in this case, the traffic can pass through the microprocessor and/or the hardware components.

Consequently, in the example considered, the computer(s) 10 can exchange data with a remote server 40 through the router 20 and the network 30.

For example, the routers 20 described previously are frequently used as home routers or as SME (Small-to-Medium Enterprise) routers in such a way as to enable access of a LAN to the Internet, for example through a DSL line or optical fiber.

FIG. 2 shows in this context a typical exchange of data between a local computer 10 and a remote server 40 based upon the IP (Internet Protocol) protocol.

In particular, according to the IP protocol, each host has associated at least one IP address. For example, according to the version 4 of the IP protocol, each host has an IP address including 32 bits, which are usually expressed with four consecutive numbers in the range between 0 and 255. For example, the "external" interface 206 of the router 20, i.e., the interface connected to the WAN 30, may have the address 12.34.56.78 and the "internal" interface 202 of the router 20, i.e., the interface connected to the LAN, may have the address 192.168.0.1. Likewise, the remote server 40 could have the address 34.56.78.90, and the local computer 10 typically has an IP address that is in the same IP range as the IP address of the LAN interface 202, for example 192.168.0.50.

Specifically, in order to send data to the host 40, the host 10 sends at least one data packet including a header IP_H (e.g. shown in FIG. 3) and, as payload, the respective data IP_D (e.g. shown in FIG. 3) to the router 20, where the header IP_H contains at least the address of the sender, i.e., the IP address of the host 10, and the address of the target, i.e., the IP address of the host 40.

The router 20 receives the packet via the interface 202 and forwards the packet through the interface 206 to the WAN 30, which transmits the packet to the host 40. In general, as represented in FIG. 3, the data IP_D of an IP packet may not include directly the application data D, as, for example, required according to the protocols HTTP (HyperText Transfer Protocol) or FTP (File Transfer Protocol), but the application data D can be encapsulated in a packet of the transport layer, such as a UDP (User Datagram Protocol) packet or a TCP (Transmission Control Protocol) packet, which in turn includes a header H and, as payload, the data D; i.e., the IP data IP_D may include an additional transport-layer header H and the application data D.

For example, the UDP or TCP headers enable specification of an additional port number for communication. The differences between UDP and TCP protocols are well known to the persons skilled in the art, thus rendering a more detailed description herein superfluous. Basically, the TCP protocol is more complex in order to enable a more reliable transmission of the data using, for example, a flow control, a numbering of the sequence and a check code (checksum) for detecting transmission errors.

The router 20 may also execute further services. For instance, as shown in FIG. 2, the processing unit 204 may execute an application or process P_DHCP which implements a server of the DHCP (Dynamic Host Configuration Protocol) protocol, i.e. the processor 204 may assigns IP addresses (and possible other configuration information) to the computers 10 that are connected to the LAN, i.e., to the interface 202. Moreover, the processing unit 204 may execute an application or process P_FW that implements a firewall for blocking undesirable traffic from the WAN to the LAN and/or vice versa. In particular, this firewall P_FW is typically configured for analyzing the IP packets and verifies whether the IP packets satisfy certain rules, for example with reference to the source address, to the destination address and/or to the ports used. Moreover, the router 20 may manage an application or process P_DNS that implements a DNS (Domain-Name System) server and/or an application or process P_PROXY that implements an HTTP and/or FTP proxy server.

As mentioned before, the router 20 is configured to exchange data packets between the interfaces 202 and 206. In the case where the LAN uses private IP addresses (i.e. an IP address which is not unique, for example, in the sub-segment 192.168.X.X), the processing unit 204 may execute an application or process P_NAT, which executes a so-called NAT (Network-Address Translation). Generally, such a NAT routing permits that a single public IP address is used for the routing of data packets exchanged with a group of devices having private IP addresses.

Specifically, in this case, the LAN host 10 generates a data packet including the destination address of the remote host 40 and its own (private) IP address as source address, wherein the data packet is sent to the interface 202 of the router 20. The router 20 replaces then the original source IP address of the host 10 with the IP address of the interface 206, and replaces the original source port number with a random UDP/TCP port number, which is used to univocally identify the communication between the host 10 and the server 40.

For example, as shown in FIG. 4, usually the process P_NAT manages a NAT translation table containing for each communication originated by a LAN client connected to the interface 202 the respective source address LAN_IP and source port number LAN_SP, and the associated source address R_IP and source port R_SP used to forward the packet to the network 30. Generally, the field R_IP is purely optional, e.g. in case the router 20 supports only a single interface 206 or public IP address.

Accordingly, once the router 20 receives a data packet at the interface 206 for a given UDP/TCP port number, the router 20 can use the NAT translation table in order to recover the original IP address and source port number of the host 10, and forward the response data packets correctly to the private IP address of the host 10.

Accordingly, NAT routing is based on the fact that any communication between a host 10 connected to the interface 202 and a remote host 40 connected to the interface 206 is initiated by the host 10. Accordingly, this solution may be used to permit an access of the hosts 10 to remote servers 40 connected to the network 30.

However, those of skill in the art will appreciate that the hosts 10 is not directly reachable by a client 50 (e.g. shown in FIG. 2) connected to the network 30. For this reason, a host 10 cannot act directly as a server providing services to the WAN 30, such as web cameras, web servers, Network Attached Storages (NAS), or devices for home automation and Internet of Thigs (IoT).

In order to render such devices 10 accessible from the WAN 30, various solutions have been proposed.

The most common solution to this problem includes configuring a so-called port forwarding rule, in which one or more ports assigned to the interface 206 may be routed directly to respective port numbers associated with a respective private IP address connected to the internal interface 202, e.g., the router 20 may be configured to forward the port number 8080 of the interface 206 to the port number 80 of the IP address 192.168.0.50 associated with a host 10. Evidently, this requires that the IP address of the host 10 should remain fixed. In order to simplify the configuration, the router 20 may also support a Universal Plug and Play (UPNP) port forwarding, wherein the host 10 may request autonomously the configuration of a port forwarding rule.

Evidently, these solutions require that a public IP address be assigned to the interface 206. Unfortunately, not all network operators provide public IP addresses, but the interface 206 may be connected to the WAN 30 through at least one further NAT router of the network operator. Moreover, some routers (e.g. when using the tethering operation of a mobile phone) may not support the configuration of a port forwarding. Accordingly, in these cases, port forwarding may not be suitable. Moreover, such port forwarding may also raise security issues, because at least one port has to remain opened, which could be used to exploit some vulnerability. Hence, such solutions should not be used for security related applications, such as the control of an access door, such as the home door.

Accordingly, in order to overcome these limitations, a cloud based service may be used to forward the communication to the private host 10. Specifically, in this case, the host 10 connects automatically to a remote server 40, and a further client 50 connected to the WAN 30 may communicate with the host 10 via the remote server 40. For example, this solution is often used for devices for home automation and Internet of Thigs (IoT).

However, this requires a heavily customized cloud based service to be paid. Furthermore, each communication between the client 50 and the private host 10 is also received by the remote server 40, making this solution not appropriate for a secure communication establishment, such as in a smart home environment.

SUMMARY

On the basis of the foregoing description, the need is felt for solutions which overcome one or more of previously outlined drawbacks.

According to one or more embodiments, such an object is achieved through a method disclosed in the embodiments described below. Embodiments moreover concerns a related system, as well as a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is evidently intended to highlight the possibility for the present disclosure to be implemented in a distributed/modular fashion.

As mentioned before, various embodiments of the present disclosure relate to a method for transmitting at least one IP data packet from a first device to a second device. In this respect, embodiments of the present disclosure relate to solutions when the second device is behind a NAT router.

Specifically, in various embodiments, an IP address is associated with the first device, and an IP address and a telephone number are associated with the second device.

In various embodiments, the first device is configured to transmit a message of the Short Message Service (SMS) to the telephone number associated with the second device. For this purpose, the first and second device may include a mobile communication interface, or any other suitable communication interface adapted to send and receive SMS massages. For example, e.g. in case the first device is a mobile device, the first device may send the SMS message in response to a user's activity. However, the first device may send the SMS message also automatically, e.g. in case the first device is a proxy server receiving a data packet from a client application possibly installed on another host.

In various embodiments, the second device receives thus the SMS message from the first device. Specifically, in response to this SMS message, the second device may determine the IP address of the first device and transmit an IP packet to this IP address. For example, in various embodiments, the SMS message may include data identifying the IP address of the first device (e.g. the SMS massage may directly contain the IP address or the second device may manage a look-up-table associating a code included in the SMS message, such as the sender's telephone number, with a respective IP address). Accordingly, the second device may determine the first IP address of the first device by analyzing the content of the SMS message. Generally, before sending the IP packet, the second device may also inform a user of the second device, or a server application installed on the second device or a further device that a connection has been requested.

In various embodiments, the first device receives thus the IP packet and may determine the source IP address of the IP packet. Specifically, in various embodiments, the IP address of the second device is a private IP address. Accordingly, in this case, the source IP address of the IP packet received by the first device does not correspond to (e.g., is different from) the IP address of the second device.

Accordingly, in response to this IP packet, the first device may transmit a IP packet to the second device, by transmitting the IP packet to the source IP address of the IP packet received from the second device.

BRIEF DESCRIPTION OF THE DRAWINGS

Embodiments of the present disclosure will now be described with reference to the annexed drawings, which are provided purely by way of non-limiting example and in which:

FIG. 3 shows a block diagram illustrating a header and a payload of an Internet Protocol packet;

FIG. 4 shows processes executed by a processor during a typical exchange of data between a local computer and a remote server based upon an Internet Protocol;

FIGS. 5 and 6 show embodiments of device running a server application;

DETAILED DESCRIPTION OF ILLUSTRATIVE EMBODIMENTS

Figure 1:
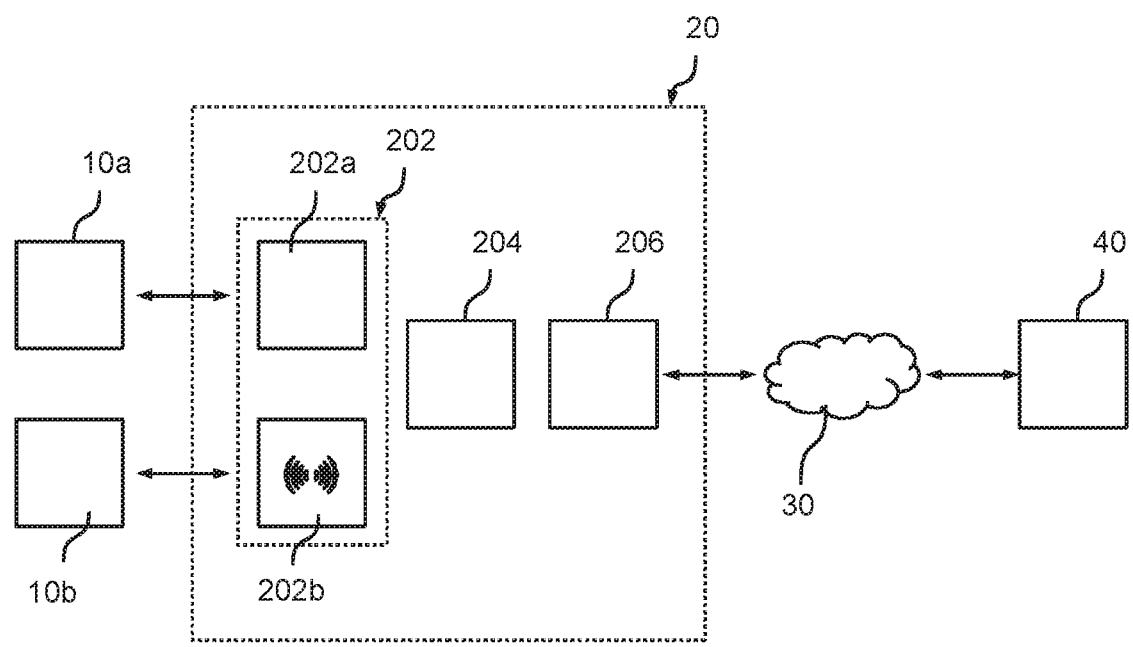
FIG. 1 shows a typical communication system.
Figure 2:
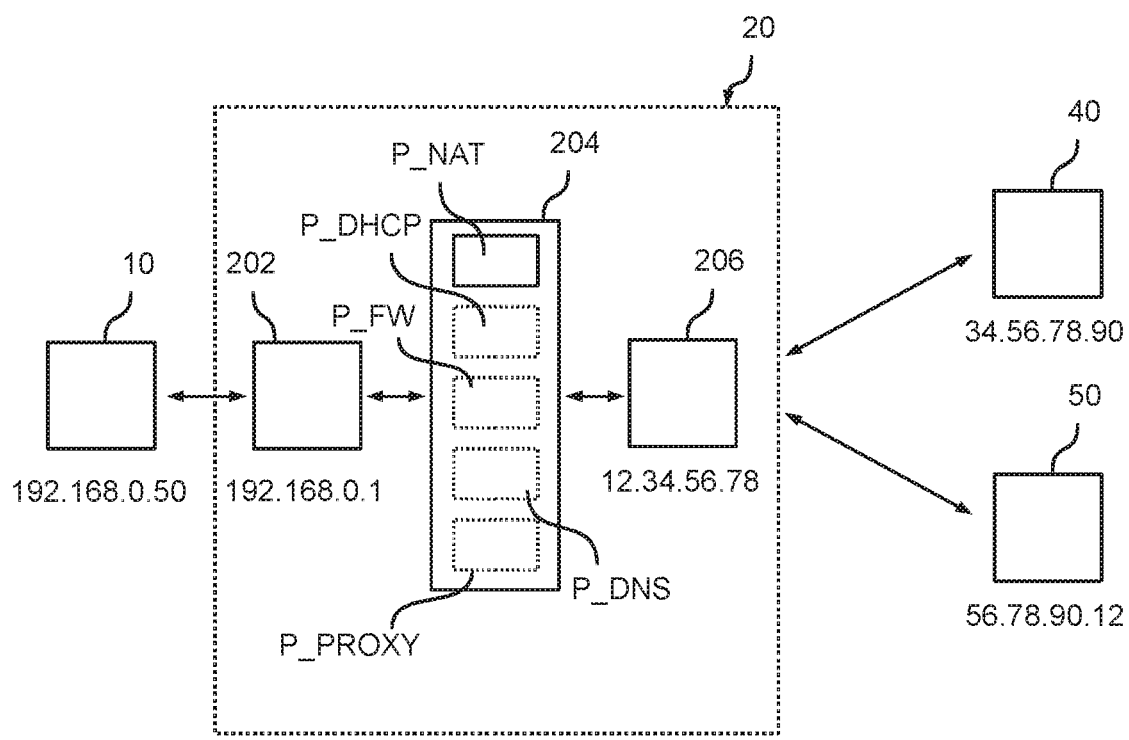
FIG. 2 shows a typical exchange of data between a local computer and a remote server based upon an Internet Protocol.

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In the following FIGS. 5 to 10, parts, elements or components which have already been described with reference to FIGS. 1 to 4 are denoted by the same references previously used in such Figures; the description of such previously described elements will not be repeated in the following in order not to overburden the present detailed description.

As mentioned before, various embodiments of the present description relate to solutions which enable a client 50 to access a service provided by a host 10 being connected to a WAN 30 through a NAT router 20. Accordingly, the respective description of FIGS. 1 to 4 will not be repeated.

Specifically, as mentioned before, NAT routing is based on the fact that, when a host 10 accesses a remote server 40, the router 40 creates via the NAT table a dynamic route through which response packets from the server 40 may be routed to the host 10.

The inventor has observed that the client 50 may access a service provided by the host 10, when the host 10 first makes an access request to the client 50. In fact, in this way, the client 50 may communicate with the host 10 by using the dynamic route (as specified in the NAT table) used for the response traffic from the client 50 to the host 10. Moreover, the inventor has observed that, in order to perform the initial access request to the client 50, the host 10 should know in some way the IP address and port number to be used for the initial request to the client 50.

FIG. 5 shows an embodiment of a host/device 10*a* in accordance with the present description.

Generally, the device 10*a* includes one or more processors 102 connected to one or more memories 104.

In various embodiments, the device 10*a* includes moreover at least one communication interface 100 for communication with the interface 202 of the router 20, such as an Ethernet and/or Wi-Fi interface. Accordingly, in various embodiments, the device 10*a* is configured to manage the IP protocol for the interface 100, i.e. the interface 100 may have assigned a dynamic IP address (e.g. via a DHCP server of the router 20) or a static IP address.

In the embodiment considered, the device 10*a* includes moreover a mobile communication interface 106 for communication with a base station BS. For example, the mobile communication interface 106 may include a GSM (Global System for Mobile Communications), CDMA (Code Division Multiple Access) transceiver, W-CDMA (Wideband Code Division Multiple Access), UMTS (Universal Mobile Telecommunications System), HSPA (High-Speed Packet Access) and/or LTE (Long Term Evolution) transceiver.

The device 10*a* may include also a user interface no and/or a further communication interface 112. For example, the user interface no may be a touchscreen. However, the user interface no is purely optional, e.g. in case the device is a stand-alone device, such as an embedded system, such as alarm system, gas meter or other types of remote monitoring and/or control systems. Similarly, the interface 112 is optional and may be used to exchange data with a further processing unit of an embedded system. For example, in this case, the interface 112 may be a digital communication interface, such as a UART (Universal Asynchronous Receiver-Transmitter), SPI (Serial Peripheral Interface) and/ or USB (Universal Serial Bus) communication interface. Generally, the processing unit 102 may also be directly the main processor of an embedded system. In this case the interface 112 may be used to exchange data with one or more sensors and/or actuators. For example, in this case, the interface 112 may be implemented by means of one or more analog interfaces and/or digital input/output ports of the processing unit 102.

In the memory 104 may be stored e.g. an operating system OS being executed by the processor 102 and which manages the general functions of the device 10a, such as: the management of the user interface no and/or the communication interface 112, the management of the IP protocol for the interface 100, and the establishment of a connection to the base station BS via the interface 106.

The memory 104 may also contain applications being executed by the operating system OS. For example, as will be described in the following, the memory 104 may include a server application SRV (i.e., a computer-program product) providing one or more services, such as a service used to control one or more devices connected to the interface 112, such as one or more actuators, e.g. in order to open an access door.

In various embodiments, for establishing a connection with the base station BS, the device 10a is coupled to a Subscriber Identity Module (SIM) module 108 configured to manage the identity identification of the user. For example, the device 10a may include a card holder for receiving a card including a SIM application, which is usually called SIM card. Generally, a corresponding SIM module may also be installed directly within the device 10a. For example, nowadays is often used a Universal Integrated Circuit Card (UICC) 108, which is a smart card often used in GSM and UMTS networks. The UICC ensures the integrity and security of all kinds of personal data and typically holds a few hundred kilobytes. Also a UICC may be integrated directly in the device 10a and is in this case often called embedded UICC (eUICC). For example, in a GSM network, the UICC 108 contains a SIM application, and, in a UMTS network, a USIM application. A UICC may contain several applications, making it possible for the same smart card to give access to both GSM and UMTS networks. Accordingly, the reference to a SIM module in the following of the present description is intended to include both 2G and/or 3G SIM modules and applies also the case in which such a SIM module is provided on a SIM card.

Figure 6:
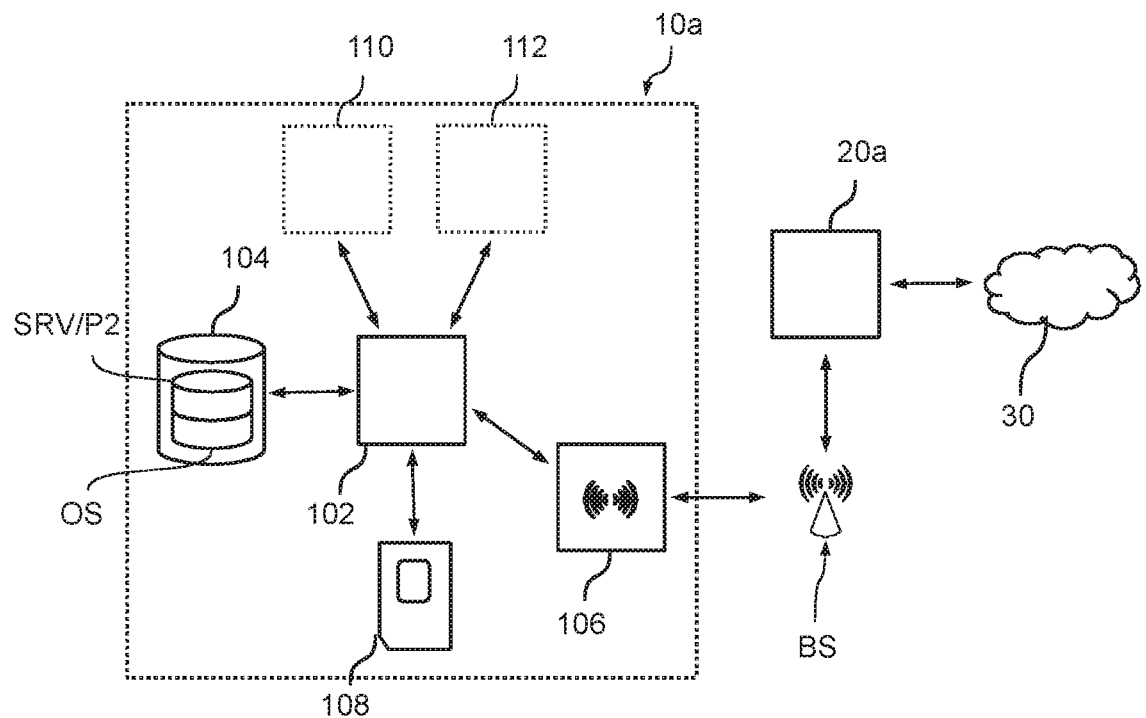

As shown in FIG. 6, the communication interface 100 is purely optional, because the device 10 may be connected to the network 30 also via the mobile communication interface 106. In fact, modern mobile communication interface 106 may also support data traffic. In this case, the router 20 may be a router 20a of the mobile network operator. Accordingly, in this case the interface 106 has associated an IP address and the device 10a is connected to the WAN network 30 via the base station BS and the router 20 of the mobile network operator.

Figure 7:
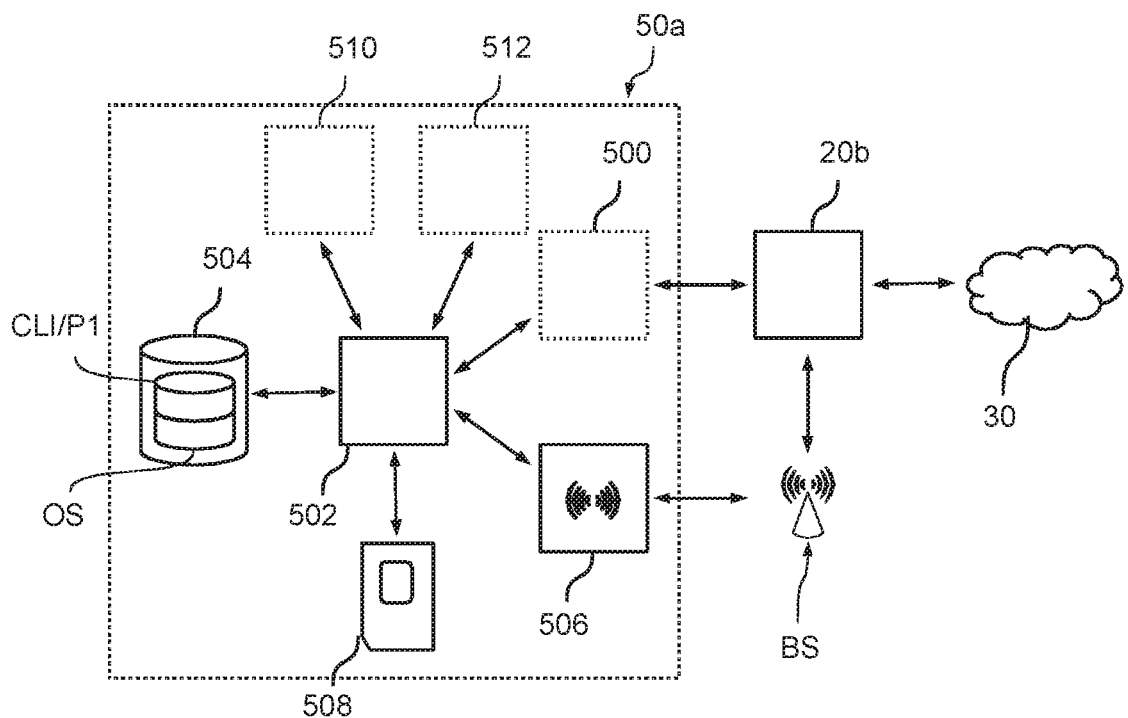
FIG. 7 shows an embodiment of device running a client application.

FIG. 7 shows an embodiment of a host/device 50a in accordance with the present description.

Generally, the device 50a has a structure essentially corresponding to the basic structure of the device 10a described with respect to FIGS. 5 and 6.

Accordingly, the device 50a includes one or more processors 502 connected to one or more memories 504.

In various embodiments, the device 50a includes moreover a mobile communication interface 506 for communication with a base station BS. For establishing a connection with the base station BS, the device 50a is coupled to a SIM module 508, such as a UICC or eUICC.

The device 50a includes moreover at least one communication interface 500 and/or mobile communication interface 506 for connection to the WAN network 30.

For example, the communication interface 500, such as an Ethernet and/or Wi-Fi interface, may be connected via a router 20b to the WAN network 30 or the mobile communication interface 506 may be connected to the WAN network 30 via a base station BS and a router 20b of a mobile network operator. Accordingly, in various embodiments, the device 50a is configured to manage the IP protocol for the interface 500 or 506, i.e. the interface 500 or 506 may have assigned a (dynamic or static) IP address.

In various embodiments, the device 50a may include also a user interface 510 and/or a further communication interface 512 (see also the description of the blocks 110 and 112).

Similar to the memory 104, the memory 504 may contain an operating system OS being executed by the processor 502 and which manages the general functions of the device 50a, such as: the management of the user interface 510 and/or the communication interface 512, the management of the IP protocol for the interface 500 or 506, and the establishment of a connection to the base station BS via the interface 506.

The memory 504 may also contain applications being executed by the operating system OS. For example, as will be described in the following, the memory 504 may include a client application CLI (e.g., a computer-program product) requesting access to one or more services provided by the device 10a.

Figure 8:
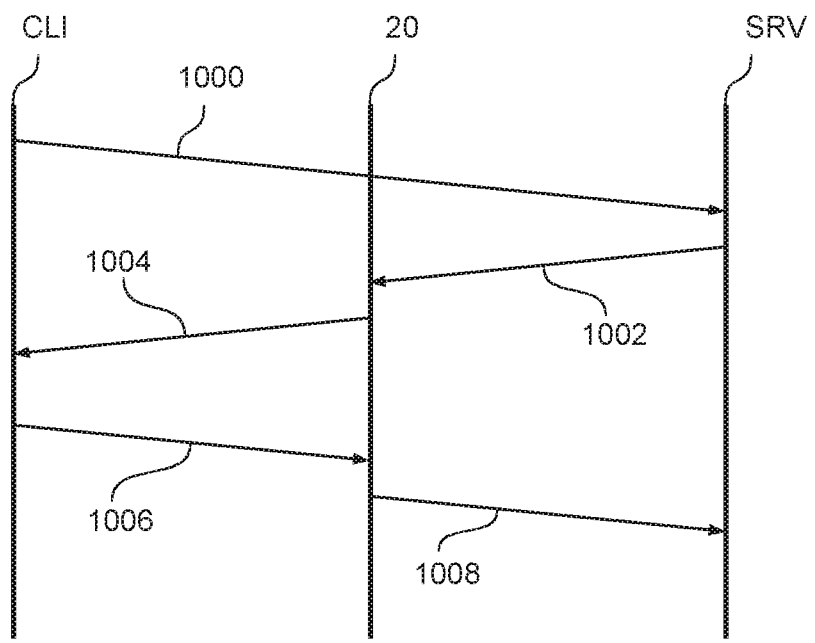
FIGS. 8 to 10 show various embodiments of the exchange of information between the devices of FIGS. 5, 6 and/or 7.

FIG. 8 shows an embodiment of the communication between the device 50a and the device 10a, in particular between the client application CLI and the server application SRV.

Specifically, once a user of the device 50a requests access to the device 10a, the device 50a/client CLI sends at a step 1000 a SMS message to the device 10a/server SRV, i.e. the telephone number associated with the interface 106. Specifically, this request is sent from the interface 506 of the device 50a to the interface 106 of the device 10a. Accordingly, this SMS message bypasses the router 20a which may implement a NAT routing.

Specifically, in various embodiments, the SMS message contains the IP address of the device 50a used to exchange IP packets with the WAN network 30. Accordingly, based on whether the device 50a is connected to the WAN network 30 via the interface 500 or the interface 506, the IP address may correspond to the IP address of the interface 500 or the interface 506. In various embodiments, in particular in case of TCP or UDP communications, the SMS message may also contain a port number.

Once the device 10a/server SRV receives the SMS message via the interface 506, the device 10a/server SRV may send at a step 1002 a (TCP or UDP) IP packet to the router 20 (or similarly the router 20a) containing an access request to the IP address and possibly a given port number (e.g., a fixed port number or the port number provided in the SMS message). Generally, this request is send via the interface connected to the network 30, i.e. the interface 100 or the interface 106 (see the description of FIGS. 5 and 6).

Accordingly, in the embodiment considered, the TCP or UDP IP packet may contain: the IP address specified in the SMS message as destination IP address; a fixed port number or the port number specified in the SMS message as destination port number; the IP address of the device 10a, e.g. the IP address of the interface 100 or 106, as source IP address; and a given port number (e.g., a random number) as source port number.

In the embodiment considered, the router 20 forwards at a step 1004 the IP packet then to the network 30, thereby forwarding the IP packet to the device 50a/client CLI. Specifically, when the IP address of the device 10a is a public IP address, the router 20 may directly forward the IP packet. Conversely, in case the IP address of the device 10a is a private IP address, the router 20 may perform a NAT routing, i.e. the router will update a NAT routing table and replace the source IP address with its own public IP address (e.g., the IP address associated with the interface 206) and the source port number with a (e.g., random and/or univocal) port number, which is used to forward response packets from the network 30 correctly to the device 10a.

Accordingly, in the embodiment considered, the device 50a/client CLI receives the IP packet from the network 30. For this purpose, the device 50a/client CLI may open a port for receiving IP requests. Specifically, this port corresponds to the above mentioned fixed port number or the port number provided in the SMS message.

Accordingly, in the embodiment considered, a NAT router 20 would have configured a dynamic route and the device 50a/client CLI may communicate with the device 10a/server SRV via this route. For example, the device 50a/client CLI may send a request to the device 10a/server SRV, such as a command to open an access door.

For this purpose, the device 50a/client CLI may send at a step 1006 a TCP or UDP IP packet to the network 30 containing: the IP address and port number included in the packet received at the step 1004, i.e. the IP address and port number of the dynamic route created by the router 20; the IP address of the device 50a, e.g. the IP address of the interface 500 or 506, as source IP address; and a given port number as source port number, which may correspond again to the above mentioned fixed port number or the port number provided in the SMS message.

Accordingly, the router 20 receives this packet and forwards at a step 1008 the packet to the device 10a/server SRV. Specifically, in case the IP address of the device 10a is a private IP address, the router 20 may use the NAT routing table to replace the destination IP address and port number with the IP address and port number originally used by the device 10a/server SRV for the IP packet sent at the step 1002.

Accordingly, in the embodiment considered, the device 50a sends an initial SMS message to the telephone number associated with the interface 106 of the device 10a.

In response to this SMS message, in case the identity of the client 50 is confirmed (i.e. its telephone number associated with the interface 506 is allowed to start a communication), the device 10a contacts the device 50a by means of the IP address (and possibly the port number) of the device 50a/server SRV, e.g., the IP address included in the SMS message. This IP packet opens the dynamic route (essentially characterized by the IP address and port number used by the router 20) at the router 20 for the response packets.

Accordingly, once the device 50a receives the packet (including the IP address and port number of the router 20), the device 50a may reply to the latter with one or more IP packets to the device 10a using the dynamic route, i.e. by using the IP address and port number used by the router 20 as destination IP address and port number.

Accordingly, the solution described with respect to FIG. 8 may not be used directly with conventional client applications CLIa, such as conventional FTP or HTTP clients, because the client application has to be modified in order to send the initial SMS message.

Figure 9:
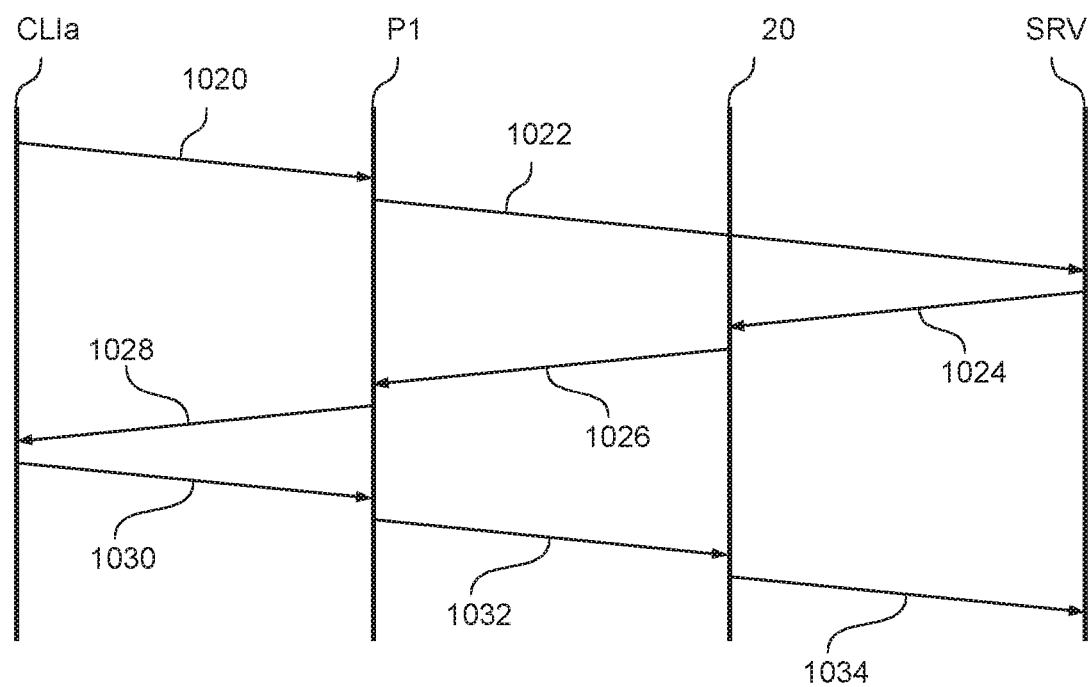

FIG. 9 shows instead an embodiment in which a proxy/translation application P1 (i.e., a computer-program product) is used for this purpose.

In various embodiments, the client application CLIa and the proxy application P1 are installed on the same device 50a, or the client application CLIa and the proxy application P1 are installed on two separate devices. In fact, in general it is sufficient that the client application CLIa and the proxy application P1 may exchange data, e.g. via the IP protocol. Generally, the proxy application P1 is installed on a device 50a having substantially the architecture shown in FIG. 7 and includes one or more communication interface for sending both SMS messages and IP packets (e.g., the interfaces 506 and optionally 500). Conversely, the client application CLIa may be installed on any device having at least one communication interface for exchanging data with the device having installed the proxy application P1. For example, the proxy application P1 may be installed on the router 20b (see FIG. 7) configured to connect the client device 50a to the WAN 30. In this case, the router 20b may include also a mobile communication interface for sending the SMS message.

In the embodiment considered, the client application CLIa sends at a step 1020 a connection request to the proxy application P1. Specifically, in case both applications are installed on the same device, the connection request may be send to the localhost IP address (e.g., 127.0.0.1) providing the port number of the proxy server P1. Otherwise, the connection request may be sent to the IP address of the proxy server P1. The connection request may also contain data identifying the target server, e.g. the telephone number. Generally, the proxy application P1 may also manage a list of destination servers, wherein with each server is associated at least a respective telephone number.

Thus, once having determined the telephone number associated with the target server SRV, the proxy server P1 sends at a step 1022 the initial SMS message to the telephone number of the device having installed the server SRV. Accordingly, the step 1022 corresponds substantially to the step woo discussed with respect to FIG. 8. Specifically, in this case, the SMS message may contain the IP address of the device having installed the proxy application P1.

Accordingly, once the server SRV receives the SMS message, the server SRV connects to the proxy server P1. As described in the foregoing, the server SRV sends for this purpose at a step 1024 an IP packet to the router 20 and the router 20 forwards at a step 1026 the IP packet via the network 30 to the proxy server P1. Specifically, the router 20 may use for this purpose a NAT routing wherein the source IP address and port number of the IP packet is replaced. Accordingly, these steps correspond to the steps 1002 and 1004 discussed with respect to FIG. 8.

In the embodiment considered, when the proxy server P1 receives the IP packet, the proxy server P1 responds at a step 1028 to the client application CLI that the connection has been established. The client application CLI may then send at a step 1030 one or more further IP packets to the proxy application P1, which should be forwarded to the server SRV.

Specifically, when the proxy application P1 receives further packets, the proxy server may replace: a) the original source IP address and port number with the IP address of the device having installed the proxy application P1 and a given port number; and/or b) the original destination IP address and port number (corresponding to the IP address and port number of the proxy server P1) with the IP address and port number of the router 20 used to forward the packet to the server SRV.

Accordingly, as described with respect to the steps 1006 and 1008 of FIG. 8, the router 20 may receive these packets and forward the packets to the server SRV.

Figure 10:
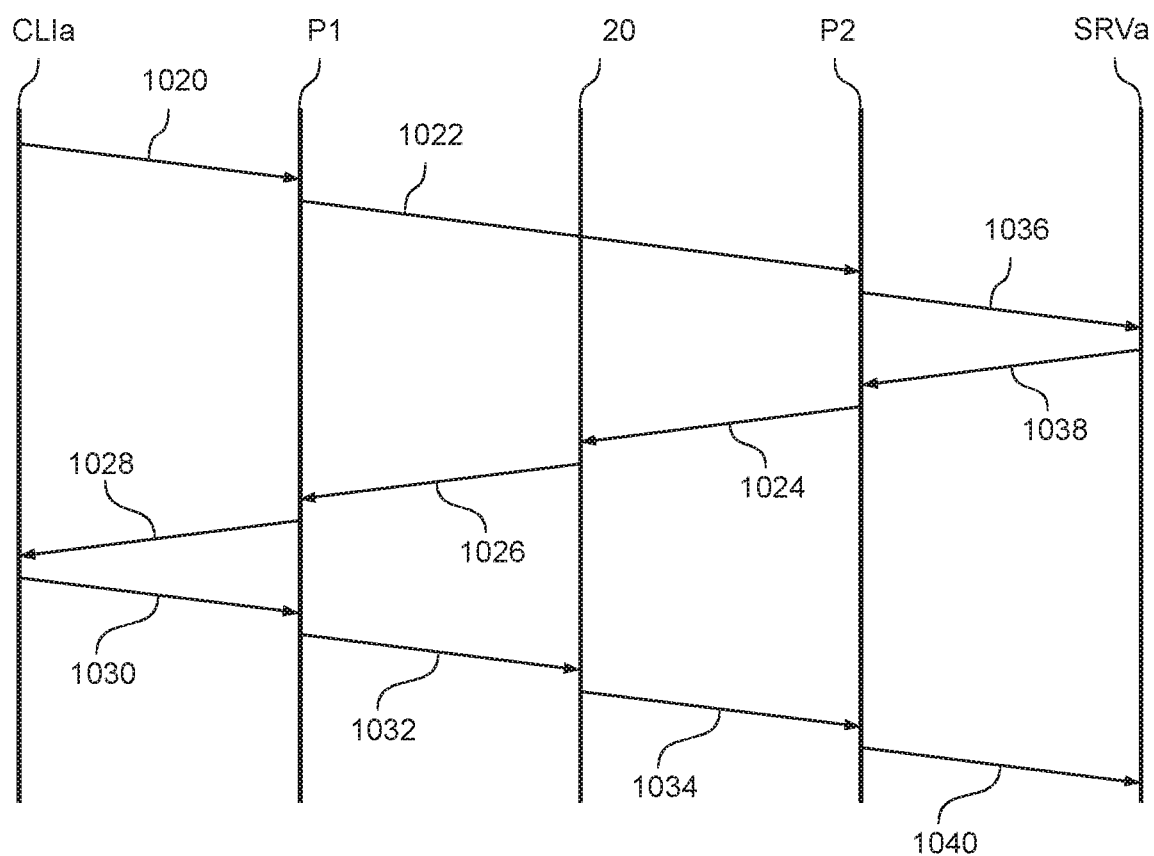

FIG. 10 shows that also the server SRV may be split in a proxy application P2 (i.e., a computer-program product) and a server application SRVa. Similar to the client application CLIa and proxy application P1, also the server application SRVa and the proxy application P2 may be installed on the same device or two devices. In fact, in general it is sufficient that the server application SRVa and the proxy application P2 may exchange data, e.g. via the IP protocol. Generally, the proxy application P2 is installed on a device 10a having substantially the architecture shown in FIG. 5 or 6 and includes one or more communication interface for receiving both SMS messages and IP packets (e.g., the interfaces 106 and optionally 100). Conversely, the server application SRVa may be installed on any device having at least one communication interface for exchanging data with the device having installed the proxy application P2. For example, the proxy application P2 may be installed on the router 20 or 20a (see FIGS. 5 and 6) configured to connect the device 10a to the WAN 30. In this case, the router 20/20a may include also a mobile communication interface for receiving the SMS message.

Accordingly, in this case, the proxy server P1 sends at the step 1022 the SMS message to the proxy server P2. In various embodiments, the SMS message may also include the IP address and/or port number of the server SRVa.

The proxy server in turn generates at a step 1036 a new connection request to the IP address and port number of the server SRVa and the server SRVa confirms the connection request at a step 1038.

Accordingly, the proxy server P2 may connect to the proxy server P1. Specifically, as described with respect to steps 1024 and 1026, the proxy server P2 may send for this purpose an IP packet to the router 20 and the router 20 forwards the IP packet via the network 30 to the proxy server P1.

Accordingly, the procedure may continue with the steps 1028-1032 as described with respect to FIG. 9, i.e. the proxy server P1 receives the connection request from the proxy server P2, inform the client application CLIa and the proxy server P1 sends a new data packet to the IP address and port number of the router 20. However, in this case the packet is forwarded at the step 1034 to the proxy server P2, because the dynamic route has been created for a connection initiated by the proxy server P2. The proxy server P2 may then in turn forward at a step 1040 the packet to the server SRVa.

Accordingly, in the embodiment considered, the server application SRVa may be a conventional application, such as a web or FTP server. Generally, the proxy server P2 may also be used directly with the client application CLI. In fact, the proxy server P2 does not know whether the SMS message has been received directly from the client application CLI or the proxy application P1, and the remaining communications are only based on TCP or UDP IP packets, which is based merely on source and destination IP addresses and port numbers.

In fact, the embodiments described with respect to FIGS. 8 to 10 have in common that a first device 50a (having installed the application CLI or P1) has to transmit at least one (TCP or UDP) IP packet to a second device 10a (having installed the application SRV or P2), e.g., in response to a user's request or other events (e.g., the request for establishing a connection received from the client CLIa at the step 1020).

Specifically, in order to establish an IP connection between the two devices 50a and 10a, the first device 50a determines a telephone number associated with the second IP device 10a and sends a SMS message to the telephone number associated with the second device 10a. Generally, the SMS message may also contain the IP address of the first device 50a, and optionally a port number.

The second device 10a receives thus the SMS message. Generally, in response to this SMS message, the second device may also perform further actions, such as establishing a connection with the server SRVa (see steps 1036 and 1038) or verifying whether the sender telephone number is authorized to establish the connection, etc.

Next, the device 10a determines the IP address (and when using TCP or UDP the port number) of the first device 50a, e.g. based on the content of the SMS message, e.g. directly when the SMS message contains the IP address or indirectly, e.g., based on the sender's telephone number which may be associated via a look-up table with a respective IP address.

The second device 10a may then send an IP packet to the IP address (and when using TCP or UDP the port number) of the first device 50a. Specifically, during this transmission, the IP packet may be modified, e.g. due to a NAT routing, i.e. the source IP address (and when using TCP or UDP the port number) of the original IP packet transmitted by the device 10a does not have to correspond to the source IP address (and when using TCP or UDP the port number) of the IP packet received by the device 50a. In any case, the source IP address (and when using TCP or UDP the port number) of the IP packet received by the device 50a, still identifies the route to the second device 10a.

Accordingly, in various embodiments, the first device 50a determines the source IP address (and when using TCP or UDP the port number) of the IP packet received. Generally, in response to the IP packet, the first device 50a may also perform further actions, such as confirming the establishment of the connection to the client CLIa (see step 1028) or verifying whether the IP packet indeed has been sent in response to the SMS message. For example, for this purpose, the first device 50a may be configured to include a (random) code in the initial SMS message, and the second device 10a may be configured to include this code in the IP packet sent to the first device 50a. However, also more complex operations may be performed such as symmetric or asymmetric encryption of the IP packets exchanged, possibly also based on one or more information included in the initial SMS message.

In the embodiment considered, the IP packet sent by the second device 10a establishes thus the IP connection. Accordingly, in response to the IP packet, the first device 50a may send at least one IP packet to the second device by using as destination IP address of the IP packet the source IP address determined for the IP packet (and when using TCP or UDP, the source port number determined for the IP packet as destination port number of the IP packet). In fact, intermediate routers will use these destination data to correctly forward the IP packet to the second device 10a.

Accordingly, the second device 10a will receive the IP packet and may perform one or more operations, such as process the content of the IP packet (e.g., in case the second device 10a implements the server SRV or runs also the application SRVa) or forward the IP packet to the server SRVa.

Accordingly, the solutions described in the foregoing, permit that the first device 50a establishes a connection with the second device 10a, even when the device 10a is under NAT. Moreover, the solution may also be used, when the NAT router is managed by a network operator. In fact, in this case, a traditional port forwarding may not be configured.

Moreover, no port is opened at the router 20, which might be detected by a port scanning of the router 20.

Accordingly, the described solution is particularly suitable for smart home or IoT applications. In fact, in this case the proxy server P2 and the server application SRVa, or alternatively the server application SRV may be installed on the same embedded system 10a, which has access to the internet 30, e.g. via a mobile communication interface 106, or a network interface 100 and a router 20. However, as mentioned before, the proxy server P2 may also be installed on the router 20/20a.

In case the user's device 50a has a mobile communication interface (506), such as a mobile phone, the client application CLI, or the client application CLIa and the proxy application PIA may be installed directly on the user's device. Conversely, in case the user's device does not include a mobile communication interface, such as a desktop PC, the proxy server P1 may be installed on a server with mobile communication interface and connection to the internet 30, such as the router 20b. Accordingly, in this case, the user may control the operation of the device 10a by sending the commands from the user's device to such a server.

Of course, without prejudice to the principle of the invention, the details of construction and the embodiments may vary widely with respect to what has been described and illustrated herein purely by way of example, without thereby departing from the scope of the present invention.

What is claimed is:

1. A method comprising:
    transmitting a connection request from a client application of a first device to a proxy application;
    in response to the connection request, transmitting a message from the proxy application to a telephone number associated with a second device, the message bypassing a router while being transmitted from the proxy application to the telephone number associated with the second device;
    receiving the message at the second device and, in response to the message, determining a first Internet Protocol (IP) address associated with the proxy application and transmitting a first IP packet via the router from the second device to the first IP address;
    receiving the first IP packet, by the proxy application, and determining a source IP address of the first IP packet; and
    transmitting a second IP packet via the router to the determined source IP address of the first IP packet.

2. The method of claim 1, wherein the proxy application is installed in the first device.

3. The method of claim 1, wherein transmitting the connection request from the client application to the proxy application comprises transmitting the connection request using an IP protocol.

4. The method of claim 1, wherein the connection request comprises data based on the telephone number associated with the second device.

5. The method of claim 1, wherein the message comprises a Short Message Service (SMS) message that comprises the first IP address.

6. The method of claim 5, wherein the SMS message further comprises a random code.

7. The method of claim 1, further comprising determining, by the client application, the telephone number associated with the second device.

8. The method of claim 1, further comprising:
    in response to receiving the first IP packet, transmitting a response from the proxy application to the client application; and
    in response to receiving the response by the client application, transmitting the second IP packet from the client application to the proxy application.

9. The method of claim 1, wherein the first device and the second device are simultaneously connected to a Wide-Area Network (WAN) network.

10. The method of claim 1, further comprising encrypting or decrypting IP packets based on the message.

11. A method comprising:
    transmitting a first connection request from a client application of a first device to a first proxy application;
    in response to the first connection request, transmitting a message from the first proxy application to a telephone number associated with a second device that comprises a second proxy application, the message bypassing a router while being transmitted from the first proxy application to the telephone number associated with the second device;
    receiving the message by the second proxy application and, in response to the message, determining a first Internet Protocol (IP) address associated with the first proxy application, and transmitting a second connection request from the second proxy application to a server application;
    in response to receiving the second connection request, transmitting a confirmation from the server application to the second proxy application;
    in response to receiving the confirmation from the server application, transmitting a first IP packet via the router from the second proxy application to the first IP address;
    receiving the first IP packet, by the first proxy application, and determining a source IP address of the first IP packet; and
    transmitting a second IP packet via the router to the determined source IP address of the first IP packet.

12. The method of claim 11, wherein the server application is installed in the second device.

13. The method of claim 11, wherein transmitting the second connection request from the second proxy application to the server application comprises transmitting the second connection request using an IP protocol.

14. The method of claim 11, wherein the message comprises a Short Message Service (SMS) message that comprises an IP address associated with the server application.

15. The method of claim 11, wherein the server application is a web server or a file transfer protocol (FTP) server.

16. The method of claim 11, further comprising:
    in response to receiving the first IP packet, transmitting a response from the first proxy application to the client application; and
    in response to receiving the response by the client application, transmitting the second IP packet from the client application to the first proxy application.

17. The method of claim 11, wherein the first device and the second device are simultaneously connected to a Wide-Area Network (WAN) network.

18. A method comprising:
    transmitting a message from a first device to a telephone number associated with a second device that comprises a proxy application, the message bypassing a router while being transmitted from the first device to the telephone number associated with the second device;

receiving the message by the proxy application and, in response to the message, determining a first Internet Protocol (IP) address associated with the first device, and transmitting a connection request from the proxy application to a server application;

in response to receiving the connection request, transmitting a confirmation from the server application to the proxy application;

in response to receiving the confirmation from the server application, transmitting a first IP packet via the router from the proxy application to the first IP address;

receiving the first IP packet, by the first device, and determining a source IP address of the first IP packet; and transmitting a second IP packet via the router to the determined source IP address of the first IP packet.

19. The method of claim 18, wherein the message comprises a Short Message Service (SMS) message.

20. The method of claim 18, wherein the server application is installed in the second device.

\* \* \* \* \*